Figure 1:
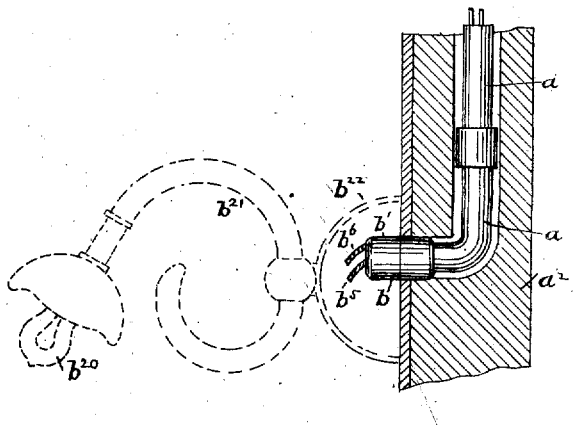

No. 11,697. Reissued Oct. 11, 1898

F. W. ERICKSON.

CONDUIT OUTLET INSULATOR.

(Application filed June 25, 1898.)

*Witnesses.*

Emma E. Erickson

William P. Corbett

*Inventor;*

Frederick William Erickson by his attorney

F. W. Willis Pierce

UNITED STATES PATENT OFFICE.

FREDERICK WILLIAM ERICKSON, OF BOSTON, MASSACHUSETTS, ASSIGNOR OF ONE-HALF TO ERIC E. ERICKSON, OF SAME PLACE.

CONDUIT-OUTLET INSULATOR.

SPECIFICATION forming part of Reissued Letters Patent No. 11,697, dated October 11, 1898.

Original No. 566,507, dated August 25, 1896. Application for reissue filed June 25, 1898. Serial No. 684,516.

*To all whom it may concern:*

Be it known that I, FREDERICK WILLIAM ERICKSON, residing in Boston, in the county of Suffolk and State of Massachusetts, have invented an Improvement in Conduit-Outlet Insulators, of which the following description, in connection with the accompanying drawings, is a specification, like letters and numerals on the drawings representing like parts.

This invention relates to an electric insulator especially designed and adapted to form part of the interior conduit system with which buildings are now commonly equipped. Buildings and like structures wired for electricity, especially in large cities, employ as a conduit for the wires a gas-pipe provided within it with a lining of insulating material, usually a tube of paper or fibrous material. The conduit in practice is mainly concealed in the walls of the building, and where it is desired to locate an electric light the end of the conduit as now commonly practiced is projected through the plaster on the wall into the room or other space in the building and the electric insulated wires are carried out of the conduit and connected in a suitable manner with the terminals of the electric lamps. The projecting end of the conduit and the wires extended out therefrom are now usually concealed by a cap or shield, commonly called a "canopy," which forms part of the electric-light fixture. In practice it frequently happens that the insulation on the electric wires is cut or broken by the rough edge of the projecting end of the metallic conduit-pipe, which frequently results in the formation of an arc between the wires and the said pipe, which is a source of danger and oftentimes results in setting the building on fire. If the insulation on the wires is not completely cut through by the edge of the metallic conduit-pipe, it is oftentimes sufficiently weakened to cause a ground on the line-circuit, thereby occasioning a loss of current due to leakage, which loss at one fixture might be disregarded commercially, but when such loss occurs at a large number of fixtures throughout a building it becomes a very important item in the cost of running the electric-light plant.

This invention has for its object to provide what I prefer to designate as an "outlet-insulator" for interior conduits, by means of which the serious results above referred to may be avoided.

In accordance with this invention the outlet-insulator referred to consists of a metallic member adapted to be connected to the metallic conduit-pipe, and an insulating member enveloping or inclosing one end or half of the metallic member, as will be described, whereby the portion of the insulator projecting from the wall into the room of the building may be covered by the insulating material, which prevents contact of the wires with the metallic pipe of the conduit, and thereby avoids the formation of arcs and also loss of current due to leakage.

Figure 2:
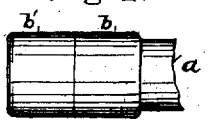
Figure 3:
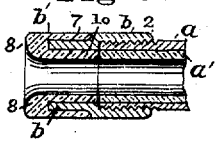
Figure 4:
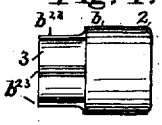
Figure 5:
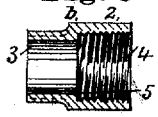

Figure 1 represents in section a sufficient portion of the wall of a building provided with an interior electric conduit having an outlet-insulator embodying this invention, the electric lamp and its fixture being represented by dotted lines. Fig. 2 is a detail in side elevation of the outlet-insulator and a portion of the conduit; Fig. 3, a longitudinal section of the outlet-insulator and conduit shown in Fig. 2; Fig. 4, a detail in elevation of the metallic member of the outlet-insulator; Fig. 5, a longitudinal section of the metallic member shown in Fig. 4; and Fig. 6, an end elevation of the metallic member shown in Fig. 4, looking toward the right.

The interior electric conduit with which my outlet-insulator is shown consists of a metallic pipe $a$ and a lining $a'$ of insulating material. The pipe $a$ is and may be an ordinary gas-pipe, and the lining $a'$ may be a tube or pipe of paper or other suitable fibrous or insulating material.

The interior conduit as now commonly employed in buildings and like structures, especially in large cities, is concealed for the greater part in the walls of the building, and to illustrate this invention I have shown in Fig. 1 a section of the conduit located in the wall $a^2$. The conduit as now commonly constructed or applied to buildings has one end projected through the wall of the building; but in accordance with this invention the conduit-pipe is provided with an outlet-insulator secured to the metallic pipe of the conduit and having its insulated end or portion projected from the wall.

The outlet-insulator forming the subject of this invention consists of a metallic member $b$, (shown separately in Figs. 4 to 6, inclusive,) the said member comprising two parts 2 3, the part 2 being of larger diameter than the part 3 and provided with screw-threads 4 on its interior to engage external screw-threads on the conduit-pipe $a$. The part 2 of the metallic member $b$, being of larger diameter than the part 3, forms an internal shoulder 5, which abuts against the end of the pipe $a$ when the outlet-insulator is screwed upon the said pipe, and the part 3, being of smaller diameter than the part 2, forms an external shoulder 6, against which abuts the outer fold or layer 7 of a covering $b'$ of insulating material, which covering envelops the part 3 of the metallic member on its outer and inner surfaces and also the end or edge of the same, and for the best results the insulated covering $b'$, which constitutes the insulating member of the insulator, is made thicker over the end or edge of the part 3 of the metallic member, as at 8, Fig. 3. The insulating member $b'$ is preferably made of a thickness on the interior of the part 3 of the metallic member substantially equal to the thickness of the lining or insulating tube or pipe $a'$ within the metallic pipe $a$ of the conduit, and the layer 10 of the insulating member $b'$ within the insulator is preferably extended to the shoulder 5, so that it abuts the insulating lining or tube $a'$ and practically forms a continuation of the same, thereby offering a smooth surface for the electric wires $b^5$ $b^6$ to be drawn over and to rest upon. The insulating member $b'$ is preferably provided with a flaring mouth, so as to offer a smooth rounded surface for the line-wires $b^5$ $b^6$ to rest upon and avoid abrasion of the insulating material on the wires. The insulating member $b'$ may be composed of any suitable or desired insulating material or composition of materials such as now commonly used for insulating purposes.

Figure 6:
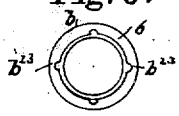

In order to more securely attach the insulating member $b'$ to the metallic member $b$, the part 3 of the member $b$ may be provided with one or more ribs or projections $b^{23}$ on its outer side, as shown in Fig. 6.

In practice the connection of the outlet-insulator with the conduit-pipe will preferably be made so that only the insulating member $b'$ extends or projects beyond the wall of the building, as shown in Fig. 1, thereby enabling the electrical connection to be made between the line-wires $b^5$ $b^6$ and the terminals of the lamp $b^{20}$, supported by the bracket $b^{21}$ or other fixture provided with the canopy $b^{22}$, which conceals the connections.

I claim—

1. An outlet-insulator for conduits consisting of a hollow metallic member adapted to be connected to the metallic pipe of the conduit, and an insulating member enveloping the outer and inner surfaces and the end or edge of the metallic member opposite to the end which is attached to the conduit-pipe, substantially as described.

2. An outlet-insulator for conduits consisting of a hollow metallic member of different diameters and insulating material enveloping the outer and inner surfaces and the end or edge of the part of the metallic member of smaller diameter, substantially as described.

3. An outlet-insulator for conduits consisting of the metallic member $b$ adapted to engage the metallic pipe of the conduit, and the insulating member $b'$ enveloping the outer and inner surfaces and edge or end of the member $b$ opposite to that which engages the conduit-pipe, substantially as described.

4. An outlet-insulator for conduits comprising a hollow metallic member adapted to be connected to the interiorly-insulated pipe of a conduit, and an insulating member or lining covering the portion of the metallic member which projects beyond the end of the insulation of the said pipe.

5. An outlet-insulator for conduits comprising a hollow metallic member having one end of its inner surface screw-threaded and the other end enveloped or lined with insulating material.

6. An outlet-insulator for conduits comprising a hollow metallic member adapted to be connected to the pipe of the conduit and having a portion adapted to abut the end of the pipe and provided with an insulating-lining adapted to abut the end of the insulation of said pipe.

7. An outlet-insulator for conduits comprising a hollow metallic member adapted to be connected to the insulated pipe of the conduit, said member having a portion adapted to abut the end of the pipe and having an insulated lining adapted to abut the lining of the pipe.

8. An outlet-insulator for conduits, composed of metallic insulating portions and having its outer end of insulating material flaring or rounded and means for securing said insulator to a conduit-pipe.

In testimony whereof I have signed my name to this specification, in the presence of two subscribing witnesses, this 13th day of June, 1898.

FREDERICK WILLIAM ERICKSON.

Witnesses:
ERIC E. ERICKSON,
WILLIAM P. CROCKETT.